US011691875B2

(12) United States Patent
Galimberti et al.

(10) Patent No.: US 11,691,875 B2
(45) Date of Patent: Jul. 4, 2023

(54) PROCESS FOR THE RECOVERY OF IODINE FROM AQUEOUS SOLUTIONS

(71) Applicant: BRACCO IMAGING SPA, Milan (IT)

(72) Inventors: Laura Galimberti, Fara Gera D'adda (IT); Andrea Banin, Collegno (IT); Sonia Gazzetto, Cascinette d'Ivrea (IT); Fernanda Di Giorgio, Pradamano (IT); Roberta Fretta, Collegno (IT)

(73) Assignee: BRACCO IMAGING SPA, Milan (IT)

( * ) Notice: Subject to any disclaimer, the term of this patent is extended or adjusted under 35 U.S.C. 154(b) by 631 days.

(21) Appl. No.: 16/619,594

(22) PCT Filed: Jun. 7, 2018

(86) PCT No.: PCT/EP2018/064981
§ 371 (c)(1),
(2) Date: Dec. 5, 2019

(87) PCT Pub. No.: WO2018/224581
PCT Pub. Date: Dec. 13, 2018

(65) Prior Publication Data
US 2020/0131036 A1   Apr. 30, 2020

(30) Foreign Application Priority Data

Jun. 7, 2017   (EP) .................................... 17174675

(51) Int. Cl.
*C01B 7/14*  (2006.01)
(52) U.S. Cl.
CPC ........ *C01B 7/14* (2013.01); *C01B 2210/0004* (2013.01); *C01B 2210/007* (2013.01)
(58) Field of Classification Search
CPC ...... C01B 2210/0004; C01B 2210/007; C01B 7/14
See application file for complete search history.

(56) References Cited

U.S. PATENT DOCUMENTS

| 4,461,711 A | | 7/1984 | Behrens | |
|---|---|---|---|---|
| 4,853,480 A | * | 8/1989 | Tustin | ..................... C07B 39/00 560/100 |
| 4,976,947 A | * | 12/1990 | Agreda | ................. C07C 51/487 423/481 |
| 5,763,650 A | * | 6/1998 | Mauro | .................. C07C 227/16 562/456 |

FOREIGN PATENT DOCUMENTS

| CA | 2147373 A1 | 5/1994 |
|---|---|---|
| CN | 103508421 A | 1/2014 |
| CN | 105460896 A | 4/2016 |
| DE | 19702814 A1 | 8/1998 |
| EP | 0106934 B1 | 1/1986 |
| EP | 1133346 B1 | 3/2003 |
| EP | 1337505 B1 | 10/2008 |
| GB | 1472050 A | 4/1977 |
| JP | S3911454 B | 6/1964 |
| JP | H06144804 A | 5/1994 |
| JP | 2008013379 A | 1/2008 |
| RU | 2233792 C2 | 8/2004 |
| WO | 1996037458 A1 | 11/1996 |

OTHER PUBLICATIONS

European Pharmacopeia, 9th ed., Council of Europe, pp. 2795-2797 (2016).
International Search Report and Written Opinion for PCT/EP2018/064981, dated Jul. 13, 2018.
Lide D.R., "CRC Handbook of Chemistry and Physics," 83rd ed., CRC Press LLC , pp. 8-21 to 8-23 (2002).
Lyday, P.A. and Kaiho, T., "Iodine and Iodine Compounds," In: Ullmann's Encyclopedia of Industrial Chemistry, Wiley VCH (2015), [retrieved on Feb. 14, 2023], Retrieved from the Internet.

* cited by examiner

*Primary Examiner* — Anita Nassiri-Motlagh
(74) *Attorney, Agent, or Firm* — Vivicar Law, PLLC

(57) ABSTRACT

The invention relates to a process for the recovery and recycling of the iodine from aqueous solutions comprising iodine-comprising aromatic compounds in which the iodine contained in said aromatic compounds is directly converted into molecular iodine at a pH lower than 1, in the absence of a catalyst.

21 Claims, No Drawings

PROCESS FOR THE RECOVERY OF IODINE FROM AQUEOUS SOLUTIONS

CROSS-REFERENCE TO RELATED APPLICATIONS

This application is the national stage application of corresponding international application number PCT/EP2018/064981, filed Jun. 7, 2018, which claims priority to and the benefit of European application no. 17174675.3, filed Jun. 7, 2017, all of which are hereby incorporated by reference in their entirety.

FIELD OF THE INVENTION

The present invention relates to a process for recovering iodine from aqueous solutions containing organic iodine, in particular iodine-containing aromatic compounds.

STATE OF THE ART

Most of commercial radiographic contrast agents currently in use (e.g. including Iopamidol and Iomeprol, from Bracco Imaging) are characterized by comprising a three-iodinated aromatic ring.

The manufacturing process of these contrast agents, and of their intermediates, generates mother liquors and wastewaters containing iodine that, depending on the process, can be present both in an inorganic form at different oxidation states (i.e. as free ions or incorporated into inorganic compounds), or in an organic form (i.e. incorporated in organic compounds).

In the last years, iodine recovery has become more and more important, both for economic and environmental reasons; it is in fact an expensive raw material and its discharge is subjected to very strict limitations.

In this perspective, the implementation of wastewaters treatments ensuring high recovery yields of both organic and inorganic iodine, and leading to substantially iodine-free effluents, represents a major point for industrial manufactures of iodinated contrast agents.

A key step for an efficient recovery of the iodine is the removal of the organic iodine incorporated in iodine-containing aromatic compounds, typically iodinated contrast agents and intermediates thereof, and its conversion into molecular iodine that is then recovered.

EP0106934 discloses a mineralization method for converting iodine contained in organic compounds into iodide in the presence of copper ions or finely dispersed copper. The recovery of the iodine is then carried out by acidification of the mineralized solution, oxidation of the formed iodide and recovery of elemental iodine.

EP1133346 proposes an improvement of the above process that comprises operating a thermal concentration of mother liquors or wastewater during the mineralization allowing to remove organic solvents, and purifying the concentrated solution by nanofiltration before the oxidative step.

CN103508421 discloses an alternative iodine recovery procedure in which the conversion (specifically alkaline reduction) of the iodine contained in organic compounds into iodide ions is carried out under reflux at alkaline conditions (pH at least 12), in the presence of a reducing substance selected from copper powder, magnesium powder, zinc powder, iron powder and mixtures thereof. A composite $H_2O_2$—$FeCl_3$ oxidizing agent is then exploited to convert iodide ions into molecular iodine, which is then separated by filtration.

CN105460896 discloses a multi-step method for the recovering of iodine from production wastes in which the iodine contained in organic compounds is converted into molecular iodine or iodide ions under acidic conditions, by using an oxidizing mixture selected from $C/Fe^{2+}$ and $Fe/Fe^{3+}$ (oxidizing conversion).

SUMMARY OF THE INVENTION

The present invention generally relates to a process for the treatment of aqueous solutions comprising iodine-containing (briefly "iodinated") aromatic compounds, wherein the iodine contained in said aromatic compounds (hereinafter "organic iodine") is directly converted into molecular iodine and recovered.

More particularly, the present invention relates to a process for recovering molecular iodine from an aqueous solution comprising a iodine-containing aromatic compound and a iodine-containing inorganic compound, said process comprising the steps of:

A) converting the iodine of said iodine-containing aromatic compound into molecular iodine; and B) collecting said molecular iodine wherein the pH of the aqueous solution comprising the iodine-containing aromatic compound undergoing the conversion of step A is 1 or lower.

Even more particularly, the present invention relates to a process as defined above wherein the pH of the aqueous solution is 0.5 or lower, e.g. from 0.01 to 0.3.

The reaction temperature is preferably of at least 80° C. or higher, more preferably of at least 90° C. or higher, even more preferably of 100° C. or higher; the temperature is preferably lower than 300° C. and, more preferably, lower than 200° C. Particularly, the conversion of step A is carried out by heating the aqueous solution at a temperature of from 80° C. to 300° C., preferably of from 90° C. to 200° C., and more preferably of from 100° C. to 150° C.

Of note, according to the process of the invention, the conversion of step A of the iodine contained in the aromatic compound into molecular iodine is efficiently carried out in the absence of a catalyst.

The conversion is preferably carried out in the presence of inorganic anions, e.g. including halides, sulfates or nitrates. Preferred aqueous solutions (to be treated) further comprise iodide ions.

In one embodiment the invention relates to a process for the treatment and the recovery of iodine from aqueous solutions containing iodinated aromatic compounds in which the iodine incorporated in these compounds is converted into molecular iodine at a pH lower than 1, in the absence of a catalyst.

In a preferred embodiment, the invention relates to a process for the treatment and the recovery of iodine from aqueous liquors of industrial processes for the manufacturing of radiographic contrast agents or iodinated intermediates thereof.

In one embodiment the process comprises the steps of:

A) Converting the iodine contained in the iodinated aromatic compounds into molecular iodine at a pH lower than 1;

A') Optional oxidation of iodide ions to molecular iodine;

B) Collection of the formed molecular iodine; and

C) Optional recovery of residual iodine.

DETAILED DESCRIPTION OF THE INVENTION

Unless otherwise provided, in the present specification and claims the term:

"iodine-containing aromatic compound" refers to aromatic compounds, comprising at least one iodine atom linked to a carbon atom(s) thereof;

"organic iodine" refers to iodine contained in organic, preferably aromatic, compounds, typically covalently linked to the carbon atom(s) thereof;

"iodine-containing inorganic compound" refers to iodine contained in inorganic compounds, such as inorganic acids or salts, including iodide ions;

"iodide" or "iodide ions" refers to iodine with oxidation number −1, i.e. as ion I−, which may be combined with a proton or with any other positive counterion, generally in dissociated form when in aqueous solution;

"inorganic iodine" refers to iodine at different oxidation states, including iodine contained in inorganic compounds, such as inorganic acids or salts (e.g. iodic acid or iodate).

The invention relates, in general, to a process for the treatment and the recovery of molecular iodine from an aqueous solution comprising a iodine-containing aromatic compound and a iodine-containing inorganic compound, said process comprising the steps of:

A) converting the iodine of said iodine-containing aromatic compound into molecular iodine; and B) collecting said molecular iodine wherein the pH of the aqueous solution comprising the iodinated aromatic compound undergoing the conversion of step A is 1 or lower.

The step A of the process is carried out under acidic condition, as above discussed.

Suitable conditions include a pH below 1 and, preferably, below 0.5. More preferably, the step A of the process is carried out with aqueous solutions having a pH below 0.3, e.g. about 0. If necessary, the pH of the solution to be treated may be suitably adjusted to these pH values, e.g. by addition of a (strong) acid, for instance selected from HCl, $H_3PO_4$, and 50% $H_2SO_4$.

The reaction is preferably operated at a temperature above 80° C.; for instance of from 80° C. and 300° C. and, more preferably, from 90° C. to 200° C.

More preferably the step A of the process is carried out at a temperature ranging from 100° C. to 150° C., e.g. about 140° C.-150° C.

In a particularly preferred embodiment the step A of the process comprises operating a conversion of iodine contained in an aromatic compound directly into molecular iodine, that is carried out by heating aqueous solutions having pH below 1 and, preferably below 0.5, at a temperature above 90° C., and, preferably, of from 100° C. to 150° C., e.g. of about 140° C.-150° C.

The direct conversion of the iodine contained in aromatic compounds into molecular iodine is, in particular, a hydrodeiodination reaction.

The term "hydrodeiodination" (or "protodeiodination") comprises within its meaning a reaction in which a iodine atom linked to a carbon atom of an aromatic ring is replaced by a hydrogen atom.

Aqueous solutions to be subjected to the hydrodeiodination include a iodine-containing aromatic compound. The concentration of the aromatic compounds in the solution is, preferably, of at least 0.01 mg/g and preferably ranges e.g. from 0.1 mg/g to 20 mg/g.

In a preferred embodiment, the aqueous solution subjected to the hydrodeiodination comprises iodine-containing aromatic compounds and iodide ions.

Suitable examples of these solutions include, for instance, aqueous liquors coming from industrial processes for the manufacturing of iodinated contrast agents, especially of non-ionic x-ray contrast agents, that typically have pH below 1 and comprise:

iodides, and, optionally, molecular iodine;
iodinated aromatic compounds.

These aqueous liquors may further comprise:
inorganic iodine, other than iodides or molecular iodine;
non-iodinated organic compounds;
non-iodinated inorganic anions, such as chlorides, sulfates, phosphates, and so on.

Preferably, the weight ratio iodide:organic iodine (i.e. the amount by weight of iodide ion vs. the amount by weight of iodine incorporated into aromatic compounds) in solution is of at least 0.5 or higher.

More preferably, the ratio is of at least 1 or higher, and, even more preferably, at least 2 or higher, up to e.g. 10.

Under the above more preferred conditions, an almost complete hydrodeiodination of iodinated aromatic compounds can be obtained, allowing an almost quantitative conversion of the organic iodine (within treated solutions) into molecular iodine, which may be then easily collected according to step B of the process.

Of note, according to the process of the invention, this conversion is achieved in the absence of a dehalogenation or conversion catalyst.

In one embodiment the hydrodeiodination reaction of step A is carried out at atmospheric pressure and temperatures below 100° C.

In an alternative embodiment, the step A is operated at higher temperatures, e.g. above 100° C. In this case, suitable equipments are exploited, allowing to reach reaction temperatures of about 140° C.-150° C., for example comprising a tank where the upper end opens with an outer flange to the body of the tank, allowing to operate the hydrodeiodination reaction at a pressure higher than atmospheric pressure, speeding the completion of the hydrodeiodination reaction. Depending on the reaction temperature, the operative pressure may for instance vary from 1 atm to 85 atm, preferably from 1 atm to 15 atm, more preferably from 1 atm to 5 atm, e.g. of about 3.5 bar.

In general the reaction times enabling for a complete conversion of a iodine-containing aromatic compound within liquors to molecular iodine will depend on iodide ion content and on the hydrodeiodination conditions, e.g. including reaction temperature and solution pH.

For instance, when the hydrodeiodination is carried out with aqueous solutions having high iodide ion content, e.g. at least equal (by weight) to the content of organic iodine, and pH below 0.5, e.g. from about 0 to 0.3, at a temperature higher than 100° C. and, preferably of from 140° C. to 150° C., a conversion of the organic iodine into molecular iodine of at least 90% (w/w), more preferably of 95% (w/w) and, most preferably, of 97% (w/w) or even more (with respect to the iodine amount comprised in the aromatic compounds of the original starting solution) is achieved in less than 3 hours, for instance in a time ranging from 20 min to 120 min, and, preferably from 20 min to 60 min.

When, alternatively, the step A of the process is carried out at a lower temperature, e.g. of about 100° C., an analogous conversion is achieved in a time e.g. of from 20 to 50 hours, preferably from 20 to 30 hours, and more preferably of about 25 hours.

After (or during) the hydrodeiodination of step A has occurred, the remaining aqueous solution is processed according to step B to collect the formed molecular iodine, optionally after having oxidized the residual inorganic iodine through step A'.

In one embodiment the molecular iodine formed during step A of the process is directly removed (at least in part) by sublimation from the reaction environment (e.g. in a continuous manner), with formation of a vapor stream of pure iodine that is then collected e.g. in a separate device, according to step B of the process.

Alternatively, the molecular iodine produced during step A may remain in the aqueous solution inside the reactor until completion of the reaction, where it precipitates (e.g. after cooling) and is then removed by filtration.

In one alternative embodiment, after step A the process further comprises an optional step A', including the oxidation of possible residual iodide ions into molecular iodine.

The optional step A' may advantageously be carried out to treat aqueous solutions rich of iodides, e.g. in which the ratio iodides:organic iodine (in solution) is above 0.5, preferably above 1.

Preferably, the oxidation of step A' is carried out under acidic conditions, e.g. by addition of an oxidizing agent to the acidic solutions resulting from step A.

In one embodiment the oxidizing agent is added to the acidic solutions collected from step A, converting possible residual iodide ions within liquors to molecular iodine.

Alternatively, the oxidizing agent may be added directly into the reactor in which the hydrodehalogenation occurs, once it is finished.

Suitable oxidizing agents are for instance selected from the group consisting of hypochlorite, chlorate, chlorine (gas), nitrite and hydrogen peroxide, the latter being particularly preferred.

The oxidizing agent, e.g. hydrogen peroxide ($H_2O_2$), is added, for instance portionwise, to the acidic solution collected from step A, in a time of from 30 to 120 min, and, preferably, from 50 to 70 min., e.g. of about 60 min, until the redox potential of the mixture reaches 600 mV (see, for instance, D. R. Lide, CRC Handbook of Chemistry and Physics, ed. $83^{rd}$, 2002 CRC Press LLC, from pag. 8-21 to pag. 8-23).

In one embodiment, the $H_2O_2$ is added to the solution collected from step A previously cooled, e.g. to a temperature below 50° C., preferably of from 20° C. to 40° C. and, more preferably of from 20° C. to 30° C., e.g. at room temperature, thereby promoting the precipitation of the molecular iodine formed by oxidation of iodides, which is then collected by filtration, according to step B of the process.

In a preferred embodiment, the step A' of the process comprises a portionwise addition of $H_2O_2$ directly to acidic liquors resulting from step A, maintained under stirring in the same reactor at a temperature of about 100° C.

When working at this temperature, the molecular iodine formed at step A, and, optionally, at step A', is suitably removed from hot liquors by sublimation, with formation of a vapor stream of pure iodine that is then collected e.g. in a separate device, according to step B of the process.

In particular, in one embodiment the step B of the process comprises removing the iodine formed during steps A and/or A' of the process by sublimation, e.g. in a vapor stream, and collecting the sublimed iodine in separate containers.

Alternatively, particularly when step A is performed in a closed reactor under pressure, the iodine produced during step A may remain in such reactor until optional step A' starts.

For instance, according to step B, the vapor stream containing iodine is conveyed and collected in an adsorption liquid, e.g. an organic solvent or, preferably, in alkali, e.g. 30% sodium hydroxide (NaOH), in which $I_2$ disproportionates into iodate ($I^{+5}$) and iodide ($I^{-1}$) ions. The acidification of the alkali liquid with e.g. 50% sulfuric acid ($H_2SO_4$), leads then to the precipitation of pure molecular iodine ($I_2$) which is collected by filtration and recycled to the manufacturing process of the desired radiographic contrast agent.

After each of the above steps A, A' or B, an aqueous solution with variable (generally decreasing from A to B) amounts of residual organic, inorganic and/or molecular iodine is obtained.

In one embodiment, the process of the invention further comprises an additional step C for recovering optional residual traces of organic iodine, inorganic iodine and/or molecular iodine. Residual traces of organic iodine may for instance derive from an incomplete deiodination at step A of the process, for example carried out at a temperature or for a time lower than optimal, or with waste not sufficiently acid, or particularly poor of iodides. Residual traces of molecular iodine may otherwise derive from an incomplete recovery in step B, for example carried out by precipitation and filtration from an aqueous solution in which the molecular iodine has a (even reduced) solubility, or caused by an incomplete sublimation from the aqueous solution.

Step C is, for instance, carried out by feeding the aqueous liquors deriving from step B, i.e. that remain after removal and collection of the iodine formed in steps A and/or A', into one or more columns loaded with absorbent material, e.g. carbon or XAD resins. Residual traces of organic, inorganic and/or molecular iodine are first fixed on the column(s) and then desorbed, e.g. by use of suitable solvents or bases, to give a concentrated solution that can be recycled to step A of the process, or may alternatively be treated according to the known procedures, for instance as disclosed in EP0106934.

More particularly, the step C of the above process preferably comprises:

i) feeding an aqueous solution from any of the above steps A, A' or B to a column, or a set of in series columns, containing an absorbent material, preferably selected from carbon or a XAD resin, fixing the residual not degraded iodine-containing aromatic compounds, iodine-containing inorganic compounds and/or molecular iodine; and then discharging exhausted eluates, that are substantially free of iodine;

ii) desorbing iodine-containing aromatic compounds, iodine-containing inorganic compounds and/or molecular iodine, e.g. by treating the column with a solvent or base (for example NaOH 30%), thus obtaining a concentrated basic solution containing said iodine-containing aromatic compounds, iodine-containing inorganic compounds and/or molecular iodine;

iii) recycling the basic solution to step A of the process, optionally after acidification to the above values; or, alternatively iv) subjecting the basic solutions collected at step ii) to a mineralization e.g. as disclosed in EP0106934, converting organic iodine into iodides that are recycled to step A or step A' of the process, or directly oxidized to molecular iodine that is then collected by filtration or sublimation, as above said.

Molecular iodine (I₂) from step ii) above is typically disproportionated into iodate (I⁺⁵) and iodide (I⁻¹) ions.

Accordingly, in one embodiment the process of the invention comprises:
A) hydrodeiodination of iodinated aromatic compounds, for converting the iodine contained in said aromatic compounds into molecular iodine;
A') oxidation of possible residual inorganic iodine-containing compounds (e.g. iodides) to molecular iodine;
B) removal and collection of the formed iodine, e.g. by precipitation or sublimation, and
C) recovery of residual iodine-containing compounds or molecular iodine.

The above process, comprehensive of any variant thereof, is of general use, and allows to efficiently treat solutions (particularly industrial liquors) containing iodine under different forms (e.g. organic iodine in a mixture with iodides, molecular and/or inorganic iodine as defined above). In particular, the process provides a substantially quantitative recovery of the total iodine content, independently on the concentration of each iodine form, with collection of exhausted wastes substantially free from iodine, that can be discharged. To this extent, if present, under the acidic conditions of step A of the process and in the presence of iodides, optional traces of inorganic iodine at oxidation state above 1 may typically be converted into molecular iodine.

It is worth noting that the absorption/desorption step C allows an efficient recovery of the organic iodine present in diluted solutions without application of any concentration treatment, such as thermal concentration. Since thermal concentration is highly energy demanding, its elimination is particularly advantageous in processes applied on a large industrial scale.

In particular, the process of the invention allows to efficiently treat strongly acidic liquors, e.g. directly collected from industrial manufacturing process of radiographic agent intermediates, which typically comprise high iodides content, promoting an exhaustive conversion of organic iodine within liquors into molecular iodine directly in step A, with a substantially quantitative recovery of the total iodine, from steps A and A' of the process, as shown, for instance, with tests of examples 1 and 9.

In a preferred embodiment the process comprises:
A) converting the iodine contained in an aromatic compound directly into molecular iodine at a pH lower than 1;
A') oxidizing a possible residual iodide ion into molecular iodine by adding an oxidizing agent to the solution of step A;
B) collecting the molecular iodine formed in steps A and/or A'; and
C) recovering a possible residual iodine-containing aromatic compound, iodine-containing inorganic compound and/or molecular iodine.

In practical terms, the above process may be carried out as above widely discussed, by implementing the steps A to C in the provided order, where the hydrodeiodination of iodinated aromatic compounds according to the step A precedes the oxidation of residual iodides carried out according to step A', optionally directly in the same reactor, with formation of molecular iodine which is collected according to step B, and the remaining solution is optionally subjected to the recovery of optional residues of organic iodine and/or molecular iodine according to step C of the proposed procedure.

Optional variants of the above implementation, in which the steps from A' to C are executed in a different schematic sequence, or that does not include one or both of the optional steps A' and C are to be considered as comprised within the scope of the present invention.

For instance, in one embodiment, in particular when the aqueous solution to be treated has a low concentration of iodide ions (e.g. when the ratio iodides:organic iodine in solution is less than 0.5), the process of the invention may be carried out without including step A'. In this case, the step C, comprising the recovery of any residual organic or molecular iodine is carried out directly after the recovery of iodine formed in step A of the process, carried out (this latter) according to step B.

In a different embodiment, e.g. when the reactions of step A or A' are carried out in an open reactor, step B may start before the respective termination of these steps.

In another embodiment, the step C of the process, may precede the step A', thereby removing residual organic iodine from the solution obtained at step A. In this case, for instance, the subsequent oxidation of the iodides may conveniently be carried out at lower temperatures, e.g. at room temperature, by leading to the precipitation of molecular iodine that is filtered and optionally further purified according to known procedures.

In a preferred embodiment, the process of the invention finds efficient use in the treatment of liquids collected from industrial processes for the preparation of x-ray contrast agents and iodinated intermediates thereof, including iodinated or partially iodinated derivatives of benzene mono or dicarboxylic acids or aminobenzene mono- or di-carboxylic acids (e.g. mono-, di- and triiodinated derivatives of aminobenzenedicarboxylic acids).

These manufacturing processes include, as a common step, the iodination of an aromatic substrate, more typically the 5-amino-1,3-benzenedicarboxylic acid, e.g. carried out as disclosed in WO96/37458.

Alternatively, the manufacturing processes of radiographic contrast agents may comprise the iodination of N,N'-bis-amides of the 5-amino-1,3-benzenedicarboxylic acid, e.g. compounds of formula (I)

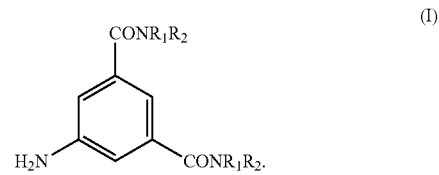

wherein
R₁ is a C₁-C₃ alkyl substituted by one or more hydroxyl groups; and
R₂ is H or is the same as R₁,
that is carried out under acidic conditions and in the presence of NaICl₂ or KICl₂, for instance as disclosed in GB 1472050 or EP 1337505.

Preferably in the above formula (I) R₁ is a propanediol, e.g. 1,3-propanediol, and R₂ is H.

Mother liquors directly collected from above iodination processes include, as such, optimal acidic conditions, namely pH below 1 and typically below 0.5, significant amounts of unreacted iodides, and iodinated, or partially iodinated, aromatic compounds (e.g. mono-, di- and triiodinated derivatives of 5-amino-1,3-benzenedicarboxylic acids).

These liquors may thus efficiently be treated with the process of the invention as such, namely without requiring any thermal concentration or addition of acids or optional additional reactants, by leading to an overall iodine recovery yield e.g. exceeding 95%, preferably of from 96 to 100%, more preferably from 97 to 100% and most preferably of from 98 to 100%, e.g. of from 98 to 99% directly at step B.

Interestingly, in fact, when these industrial liquors are treated as such with the method for the iodine recovery of the invention, an almost quantitative conversion of the organic iodine (within treated solutions) into molecular iodine, e.g. exceeding 95% and, preferably 97% is advantageously obtained directly at the step A of the process, making redundant and unnecessary the additional step C, which can thus be avoided.

In a particularly preferred embodiment the invention relates to a process for the treatment and the recovery of the iodine from liquors directly collected from the industrial iodination processes for the manufacturing of a radiographic intermediate selected from the group consisting of 5-amino-2,4,6-triiodo-1,3-benzenedicarboxylic acid and 1,3-benzendicarboxamides thereof of the above formula (I).

Most preferably, the process comprises the recovery and recycling of iodine from aqueous liquors collected from the industrial process for the manufacturing of 5-amino-2,4,6-triiodo-1,3-benzenedicarboxylic acid.

Further details concerning the iodination process of the instant invention are reported in the following experimental section, with the sole aim to better illustrate the present invention, without representing any limitation to it.

EXPERIMENTAL SECTION

The following examples are carried out either with industrial liquors or with simulated compositions thereof, essentially comprising organic iodine as mono-, di- and triiodinated derivatives of 5-amino-1,3-benzendicarboxylic acid, or of a 1,3-benzendicarboxamides of this same, and iodides.

Example 1: Hydrodeiodination+Oxidation

Step A: Hydrodeiodination 1.000 kg of industrial mother liquors, obtained from a iodination process e.g. disclosed in WO96/37458, with pH<0.1, containing 10.28 g of iodides (determined by argentometric titration) and 2.00 g of organic iodine (determined by argentometric titration, after organic iodine demolition with treatment Zn/NaOH (see, for instance, the iodine assay reported for IOPAMIDOL by the European Pharmacopeia Ed. 9.0, pag. 2795-2797) as mono-, di- and triiodinated derivatives of 5-amino-1,3-benzendicarboxylic acid, was loaded in a jacketed reactor, equipped with a mechanical stirrer and a thermometer and connected to a drechsel trap, filled with a 15% sodium hydroxide solution.

The mixture was heated to 100° C. and kept under stirring for about 24 h: hydrodeiodination occurred with formation of purple vapors of molecular iodine, that were collected by absorption in the trap containing sodium hydroxide.

At the end the residual organic iodine concentration was 0.06 g/kg, corresponding to a direct conversion of organic iodine into molecular iodine equal to 97.0%.

Iodine collected in the trap corresponded to about 31.6% of the initial total iodine content.

Step A': Oxidation

Then 5% aqueous hydrogen peroxide was added keeping the mixture at 100° C.; the addition was performed in 0.75 h until redox potential of 600 mV: iodides were oxidized to elementary (molecular) iodine that sublimed forming vapours that were collected by absorption in the trap containing sodium hydroxide.

The resulting mixture was further stirred at the same temperature for 1 h to complete the reaction and the iodine sublimation and then cooled to room temperature in 80 min.

The exhausted solution (0.926 kg) contained a residual amount of iodides (0.08 g) and organic iodine (0.055 g).

At the end of step A', the iodine collected in the trap corresponded to an overall recovery yield of 98.8%.

Example 2:
Hydrodeiodination+Oxidation+Treatment on Carbon Columns

Step A: Hydrodeiodination 3.750 kg of aqueous solution with pH=0.24, containing 5.48 g/kg of iodides and 2.04 g/kg of organic iodine essentially as mono-, di- and triiodinated derivatives of 5-amino-1,3-benzendicarboxylic acid, were loaded in a jacketed reactor, equipped with a mechanical stirrer and a thermometer and connected to a drechsel trap, filled with a 15% sodium hydroxide solution. The mixture was heated to 100° C. and kept under stirring for about 24.5 h. Hydrodeiodination occurred with formation of purple molecular iodine vapors that were collected by absorption in the trap containing sodium hydroxide. At the end the residual organic iodine concentration was 0.24 g/kg, corresponding to a direct conversion of organic iodine into molecular iodine equal to 88.2%.

Iodine collected in the trap corresponded to about 48% of the initial total iodine content.

Step A': Oxidation

Then 5% aqueous hydrogen peroxide was added keeping the mixture at 100° C.; the addition was performed in 1 h until the redox potential of the mixture reached 600 mV: iodides were oxidized thus forming vapors of molecular iodine that were collected by absorption in the trap containing sodium hydroxide. The resulting mixture was further stirred at the same temperature for 1 h to complete the reaction and the iodine sublimation and then cooled to room temperature in 60 min. The exhausted solution (3.459 kg) contained a residual amount of iodides (0.09 g/kg) and organic iodine (0.24 g/kg).

At the end of step A' iodine collected in the trap corresponded to an overall recovery yield of 96.0%.

Step C: Treatment on Carbon Column 13.55 kg of exhausted solution were prepared repeating step A and step A' procedures (iodides/molecular iodine 0.12 g/kg; organic iodine 0.20 g/kg).

The solution was loaded on a carbon column, charged with 30.5 g of dry carbon (equivalent to a bed of 80 mL of wet carbon). The loading operation was performed at a flow rate of 3 BV/h and 60° C., heating both solution and carbon.

The elution was monitored by UV using a Knauer detector ($\lambda$=335 nm) and the feeding was stopped when the absorbance exceeded 0.03 μA.

About 85 mg of organic iodine and 24 mg of iodides/molecular iodine were absorbed per g of carbon. 80 mL of sodium hydroxide and 320 mL of water were loaded on the carbon bed at 60° C., at a flow rate of 2 BV/h to recover the adsorbed iodine.

The obtained solution (412 g) had organic iodine and iodides contents respectively of 5.24 g/kg and 0.56 g/kg and can be treated according to the prior art conditions described in EP106934 or recycled in step A.

The overall iodine recovery yield, considering step A, A' and C, was 98.2%.

After the desorption step the carbon bed can be recycled and reused.

Example 3: Hydrodeiodination+Oxidation

Step A: Hydrodeiodination 3.790 kg of an aqueous solution with pH=0.28, containing 6.66 g/kg of iodides and 1.51 g/kg of organic iodine, mainly as mono-, di- and triiodinated derivatives of 5-amino-1,3-benzendicarboxylic acid, were loaded in a jacketed reactor, equipped with a mechanical stirrer and a thermometer and connected to a drechsel trap, filled with a 15% sodium hydroxide solution.

The mixture was heated to 100° C. and kept under stirring for about 25 h: hydrodeiodination occurred with formation of purple molecular iodine vapors that were collected by absorption in the trap containing sodium hydroxide.

At the end the residual organic iodine concentration was 0.16 g/kg, corresponding to a conversion of organic iodine into molecular iodine equal to 89.4%.

Iodine collected in the trap corresponded to about 33% of the initial total iodine content.

Step A': Oxidation

Then 5% aqueous hydrogen peroxide was added keeping the mixture at 100° C.; the addition was performed in 1 h until the redox potential of the mixture reached 600 mV: iodides were oxidized to elementary iodine that sublimed forming vapors that were collected by absorption in the trap containing sodium hydroxide.

The resulting mixture was further stirred at the same temperature for 1 h to complete the reaction and the iodine sublimation and then cooled to room temperature in 60 min.

The exhausted solution (3.563 kg) contained a residual amount of iodides/molecular iodine (0.07 g/kg) and organic iodine (0.15 g/kg).

At the end of step A' iodine collected in the trap corresponded to an overall recovery yield of 97.4%.

The exhausted solution is then treated with carbon according to step C procedure reported in Example 1, by leading to an overall iodine recovery yield, of 98.5%.

Example 4: Hydrodeiodination at 140° C.

The experiment was done in a closed reactor, to test the impact on the conversion of a temperature higher than 100° C., about 140° C. 45 g of a solution with pH=0.27, containing iodides (3.93 mg/g) and organic iodine (1.11 mg/g), were equally portioned in 10 mL closed reactors, kept under stirring and heated to 140° C.

After 90 min the hydrodeiodination reaction was completed and the residual organic iodine was equal to 0.9% of the initial organic iodine, corresponding to a conversion yield >99%.

Example 5: Hydrodeiodination at 140° C. with Addition of Acid

This experiment was performed to assess the effect of the pH on the hydrodeiodination kinetics.

28.4 g of the same solution of example 4, containing iodides (3.93 mg/g) and organic iodine (0.94 mg/g), were further acidified by addition of 37% hydrochloric acid (6.6 g).

The obtained solution was equally portioned in 10 mL closed reactors and heated to 140° C. keeping under stirring.

After 30 min the hydrodeiodination reaction was completed and the residual organic iodine was equal to 0.5% of the initial organic iodine.

The comparison between the results of examples 4 and 5 shows that lower pH values result in an increase of the reaction kinetics.

Example 6: Hydrodeiodination at 80° C.

The test has been carried out to assess the effect of suboptimal hydrodeiodination temperatures.

0.50 kg of aqueous liquors with pH=0.21, containing iodides (3.99 mg/g aqueous liquors) and organic iodine (1.24 mg/g, as mono-, di- and triiodinated derivatives of 5-amino-1,3-benzendicarboxilic acid), were loaded in a reactor, heated to 80° C. and maintained under stirring for about 55 h. Hydrodeiodination occurred with formation of purple molecular iodine vapors that were collected by absorption in a solution of 15% sodium hydroxide, leading to a reduction of the organic iodine concentration to a measured value of 0.78 mg/g, corresponding to a conversion of organic iodine into molecular iodine equal to 37%.

The exhausted solution is then subjected to iodides oxidation and treatment with carbon absorption carried out as disclosed in Example 2 leading to an overall iodine recovery yield of 97%.

Example 7: Hydrodeiodination+Oxidation at 100° C.

Step A: Hydrodeiodination 952.29 g of an aqueous solution, containing hydrochloric acid (pH=0.10), iodides (1.40 mg/g) and organic iodine (1.45 mg/g), mainly as 5-amino-2,4,6-triiodo-1,3-benzendicarboxylic acid, were loaded in a jacketed reactor, equipped with a mechanical stirrer and a thermometer and connected to a drechsel trap, filled with a 15% sodium hydroxide solution.

The mixture was heated to 100° C. and kept under stirring for about 25.5 h: hydrodeiodination occurred with formation of purple molecular iodine vapors that were collected by absorption in the trap containing sodium hydroxide.

At the end the residual organic iodine concentration was 0.50 mg/g, corresponding to a conversion of organic iodine into molecular equal to 65.7%.

Iodine collected in the trap corresponded to about 67.8% of the initial total iodine content.

Step A': Oxidation

Then 5% aqueous hydrogen peroxide was added keeping the mixture at 100° C.; the addition was performed in 0.5 h until the redox potential of the mixture reached 600 mV: iodides were oxidized to elementary iodine that sublimed forming vapours that were collected by absorption in the trap containing sodium hydroxide.

The resulting mixture was further stirred at the same temperature for 1.5 h to complete the reaction and the iodine sublimation and then cooled to room temperature in 60 min.

The exhausted solution (866.95 g) contained only residual organic iodine (0.48 mg/g).

At the end of step A' iodine collected in the trap corresponded to an overall recovery yield of 84.7%.

The exhausted solution is then treated with carbon as reported in Example 2, reaching to an overall yield above 96.5%.

Example 8: Partial Hydrodeiodination+Oxidation+Carbon Columns

The test comprises a partial hydrodeiodination, purportedly operated jointly with the oxidation step, to evaluate the effectiveness of step C) in compensating any suboptimal hydrodeiodination conditions Partial Hydrodeiodination+Oxidation 3.700 kg of a mother liquor solution, obtained from a iodination process e.g. disclosed in WO96/37458, with pH<0.1, containing 37.08 g of iodides and 7.32 g of organic iodine (mainly as mono-, di- and triiodinated derivatives of 5-amino-1,3-benzendicarboxylic acid) were loaded in a jacketed reactor, equipped with a mechanical stirrer and a thermometer and connected to a drechsel trap, filled with a 15% sodium hydroxide solution.

The solution was heated to 100° C. in about 1 h and then 5% aqueous hydrogen peroxide (approximately 95 g) was added keeping the mixture at 100° C.; the addition was performed in 1 h until the redox potential of the mixture reached 600 mV: molecular iodine formed during the reaction sublimed and vapours were collected by absorption in the trap.

The resulting mixture was further stirred at the same temperature for 1 h to complete the reaction and the iodine sublimation and then cooled to room temperature in 80 min.

The exhausted solution (3.419 kg) contained a residual amount of iodides (0.53 g) and organic iodine (4.39 g).

Under above conditions, the organic iodine was partially decomposed via hydrodeiodination mechanism and iodine collected in the trap corresponded to a recovery yield of 88.9%.

Treatment on Carbon Column 9.78 kg of solution were prepared repeating the previous reaction (total iodides/molecular iodine 0.29 g/kg; organic iodine 1.39 g/kg).

The solution was loaded on two carbon columns arranged in series (Col1 and Col2); each column was charged with 38 g of dry carbon (equivalent to a bed of 100 mL of wet carbon).

The loading was performed at 20-25° C. with a flow rate of 2 BV/h and was stopped when the column Col2 started to release iodinated organic compounds (breakthrough point). The eluate (9.673 kg) from Col2 contained a residual amount of iodides (0.18 g/kg) and organic iodine (0.04 g/kg), corresponding to an overall iodine recovery of 98.5%.

Example 9: Hydrodeiodination at 140° C.+Oxidation

Step A: Hydrodeiodination 52.0 g of a mother liquor solution obtained from a iodination process e.g. disclosed in WO96/37458, with pH=0.06, containing iodides (9.86 g/kg) and organic iodine (1.92 g/kg), mainly as mono-, di- and triiodinated derivatives of 5-amino-1,3-benzendicarboxylic acid, were equally portioned in 20 mL closed reactors and heated to 140° C. keeping under stirring.

After 30 min the residual organic iodine concentration was 0.04 g/kg, corresponding to 2.1% of the initial organic iodine.

Step A': Oxidation

The step A' is carried out as disclosed in Example 1. At the end of step A' iodine collected in the trap corresponded to an overall recovery yield of 99.0%.

Example 10: Hydrodeiodination at 100° C.

725 g of mother liquors deriving from iodination of 5-amino-N,N'-bis[2-hydroxy-1-(hydroxymethyl)ethyl]-1,3-benzenedicarboxamide, carried out according to WO96/737458, containing 3.68 g of organic iodine and 3.49 of iodides, were heated to 100° C. in 30 min and kept under stirring at this temperature for 47 h.

At the end the residual organic and molecular iodine were respectively 0.30 g and 0.20 g, corresponding to an overall iodine recovery of 93%. No residual iodides were present in the solution.

The exhausted solution was then treated by absorption on a carbon column according to the procedure e.g. reported in Example 2, thus achieving an overall recovery yield above 97%.

Example 11: Hydrodeiodination at 140° C.

The test exemplifies a process according to the invention that does not include step A'.

30 g of an aqueous solution, acidified to pH=0.1 with sulfuric acid, containing iodides (0.73 mg/g) and organic iodine (1.46 mg/g) mainly as 5-amino-2,4,6-triiodo-1,3-benzendicarboxilic acid, were heated to 140° C. keeping under stirring. After 6 h the residual organic iodine was equal to 30.1% of the initial organic iodine.

The resulting solution was treated with carbon according to the procedure reported in Example 2, leading to an overall recovery yield of 96%.

The invention claimed is:

1. A process for recovering molecular iodine from an aqueous solution comprising a iodine-containing aromatic compound and a iodine-containing inorganic compound comprising an iodide ion, said process comprising the steps of:
    A) converting the iodine of said iodine-containing aromatic compound into molecular iodine by contacting the iodine of said iodine-containing aromatic compound with the iodide ion without an additional reactant and heating the aqueous solution at a temperature of from 80° C. to 300° C.; and
    B) collecting said molecular iodine
    wherein the pH of the aqueous solution comprising the iodine-containing aromatic compound undergoing the conversion of step A is 1 or lower and wherein the weight ratio between the iodide ion and the iodine contained in the aromatic compound in the aqueous solution is at least 0.5 or higher.

2. The process according to claim 1, wherein the pH of the aqueous solution is 0.5 or lower.

3. The process according to claim 1, wherein the step A is carried out in the absence of a catalyst.

4. The process according to claim 1 wherein the temperature is of from 90° C. to 200° C.

5. The process according to claim 1 wherein the temperature is of from 100° C. to 150° C.

6. The process according to claim 1, wherein said weight ratio is at least 1 or higher.

7. The process according to claim 1 further comprising a step A', wherein said step A' comprises adding an oxidizing agent to the solution collected from step A and converting the possible residual iodide ions into molecular iodine.

8. The process according to claim 1 wherein the step B comprises removing the molecular iodine formed at step A of the process by sublimation, and collecting the molecular iodine in a separated device.

9. The process according to claim 1, further comprising a step C including the recovery of a possible residual iodine-containing aromatic compound and/or molecular iodine.

10. The process according to claim 1 wherein the aqueous solution of step A is an industrial liquor.

11. The process according to claim 10 wherein said aqueous solution comprises iodinated derivatives of benzene mono or dicarboxylic acids or of aminobenzene mono- or di-carboxylic acids.

12. The process according to claim 10 wherein the aqueous solution comprises an iodinated radiographic intermediate selected from the group consisting of: 5-amino-1,3-benzenedicarboxylic acid and N,N'-bis-amides thereof of formula (I)

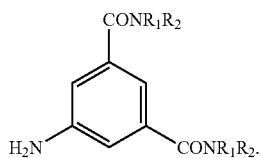

wherein $R_1$ is a $C_1$-$C_3$ alkyl substituted by one or more hydroxyl groups; and $R_2$ is H or is the same as $R_1$.

13. The process according to claim 12 wherein the intermediate is 5-amino-1,3-benzenedicarboxylic acid.

14. The process according to claim 10 wherein in step A) the conversion of the iodine of said iodine-containing aromatic compound into molecular iodine is achieved for at least 95% (w/w).

15. A process for recovering molecular iodine from an aqueous solution comprising a iodine-containing aromatic compound and a iodine-containing inorganic compound comprising an iodide ion, said process comprising:

A) converting the iodine of said iodine-containing aromatic compound into molecular iodine by contacting the iodine of said iodine-containing aromatic compound with the iodide ion without an additional reactant at a pH lower than 1 and heating the aqueous solution at a temperature of from 80° C. to 300° C.;

A') oxidizing a possible residual iodide ion into molecular iodine by adding an oxidizing agent to the solution of step A;

B) collecting the molecular iodine formed in steps A and/or A'; and

C) recovering the possible residual iodine-containing aromatic compound and/or molecular iodine.

16. The process according to claim 7 wherein the step B comprises removing the molecular iodine formed at step A' of the process by sublimation, and collecting the molecular iodine in a separated device.

17. The process according to claim 16, further comprising a step C including the recovery of a possible residual iodine-containing aromatic compound and/or molecular iodine.

18. The process according to claim 17, wherein step C comprises:

i) feeding an aqueous solution from any of the steps A, A' or B to a column containing an absorbent material fixing the residual not degraded iodine-containing aromatic compounds, iodine-containing inorganic compounds and/or molecular iodine;

ii) desorbing iodine-containing aromatic compounds, iodine-containing inorganic compounds and molecular iodine by treating the column with a base, thus obtaining a concentrated basic solution containing said iodine-containing aromatic compounds, iodine-containing inorganic compounds and/or molecular iodine.

19. The process according to claim 18 wherein said basic solution, optionally after acidification, is recycled to step A of the process.

20. The process according to claim 18 wherein said basic solution is subjected to a mineralization procedure for converting iodine-containing aromatic compounds into iodides.

21. The process of claim 20 wherein said iodides are recycled to step A or A' of the process.

* * * * *